US012337753B2

(12) United States Patent
Ive et al.

(10) Patent No.: US 12,337,753 B2
(45) Date of Patent: Jun. 24, 2025

(54) MOTOR VEHICLE WITH STEERING WHEEL PROVIDED WITH AN ILLUMINABLE PORTION

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James McGrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Patrizio Moruzzi, Modena (IT); Gianluca Fumarola, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 44 days.

(21) Appl. No.: 18/498,569

(22) Filed: Oct. 31, 2023

(65) Prior Publication Data
US 2024/0149786 A1 May 9, 2024

(30) Foreign Application Priority Data

Nov. 4, 2022 (IT) .................. 102022000022698

(51) Int. Cl.
B60Q 3/283 (2017.01)
B62D 1/04 (2006.01)

(52) U.S. Cl.
CPC .............. B60Q 3/283 (2017.02); B62D 1/04 (2013.01)

(58) Field of Classification Search
CPC . B60Q 3/283; B60Q 9/00; B62D 1/04; B60K 35/10; B60K 35/22; B60K 35/60;
(Continued)

(56) References Cited

U.S. PATENT DOCUMENTS

2009/0121459 A1 5/2009 Bostick et al.
2015/0375677 A1* 12/2015 Salter .................. F21V 9/32
362/510

(Continued)

FOREIGN PATENT DOCUMENTS

DE 102019103752 A1 8/2020
WO WO 2013183144 A1 * 12/2013 .............. B60Q 3/88
WO 2020165079 A1 8/2020

OTHER PUBLICATIONS

Translation of WO 2013183144 A1, Ohta et al., Dec. 12, 2013 (Year: 2013).*

(Continued)

Primary Examiner — Vinh Luong
(74) Attorney, Agent, or Firm — CANTOR COLBURN LLP

(57) ABSTRACT

A motor vehicle includes a steering wheel and an activation device operable to cause the motor vehicle to switch to an activation state, in which the motor vehicle becomes responsive to one or more specific commands of a driver, characterized in that the steering wheel comprises a transparent portion and a light emission device configured to light the (Continued)

transparent portion when the motor vehicle switches to the activation state by the activation device.

10 Claims, 11 Drawing Sheets

(58) Field of Classification Search
CPC ........ B60K 2360/172; B60K 2360/332; B60K 2360/782; B60K 35/28
See application file for complete search history.

(56) References Cited

U.S. PATENT DOCUMENTS

| | | |
|---|---|---|
| 2015/0375678 A1 | 12/2015 | Salter et al. |
| 2019/0337566 A1* | 11/2019 | Weidig .................... B62D 15/02 |
| 2022/0258787 A1* | 8/2022 | Gardner ................. B60K 35/00 |
| 2023/0304822 A1* | 9/2023 | Lee .................... G01C 21/3635 |
| 2024/0149787 A1* | 5/2024 | Ive ......................... B60K 35/10 |
| 2024/0377936 A1* | 11/2024 | Vallet ................. G01C 21/3688 |

OTHER PUBLICATIONS

Translation of WO 2020165079 A1, Schutz, Aug. 20, 2020 (Year: 2020).*
European Search Opinion of Application EP 23206049.1, Apr. 9, 2024 (Year: 2024).*
Italian Search Report for Application No. 202200022698; Filing Date: Nov. 4, 2022; Date of Mailing; Jun. 2, 2023; 6 pages.

* cited by examiner

MOTOR VEHICLE WITH STEERING WHEEL PROVIDED WITH AN ILLUMINABLE PORTION

CROSS-REFERENCE TO RELATED APPLICATIONS

This patent application claims priority from Italian patent application no. 102022000022698 filed on Nov. 4, 2022, the entire disclosure of which is incorporated herein by reference.

TECHNICAL FIELD

The invention relates to a motor vehicle, in particular comprising at least one electric powertrain.

PRIOR ART

In motor vehicle provided with an electric powertrain, in particular in full electric motor vehicles, the key-on state, namely the state in which the authorization needed to start the motor vehicle was provided, for example by the driver by inserting a key into a suitable switch, cannot be immediately recognized by the driver, at least compared to motor vehicles with a heat engine.

In order to overcome this drawback, the state of the art entails solutions in which a control panel or, more in general, a signaling device of the motor vehicle emits acoustic and/or light signals when the key-on state occurs.

Even though these solutions are generally suited for the purpose, there is anyway a strong need for a further improvement in terms of immediateness of recognition of the key-on state by the driver.

The object of the invention is to fulfil the need discussed above, preferably in a simple and reliable fashion.

DESCRIPTION OF THE INVENTION

Said object is reached by a motor vehicle as defined in claim 1.

The dependent claims define special embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
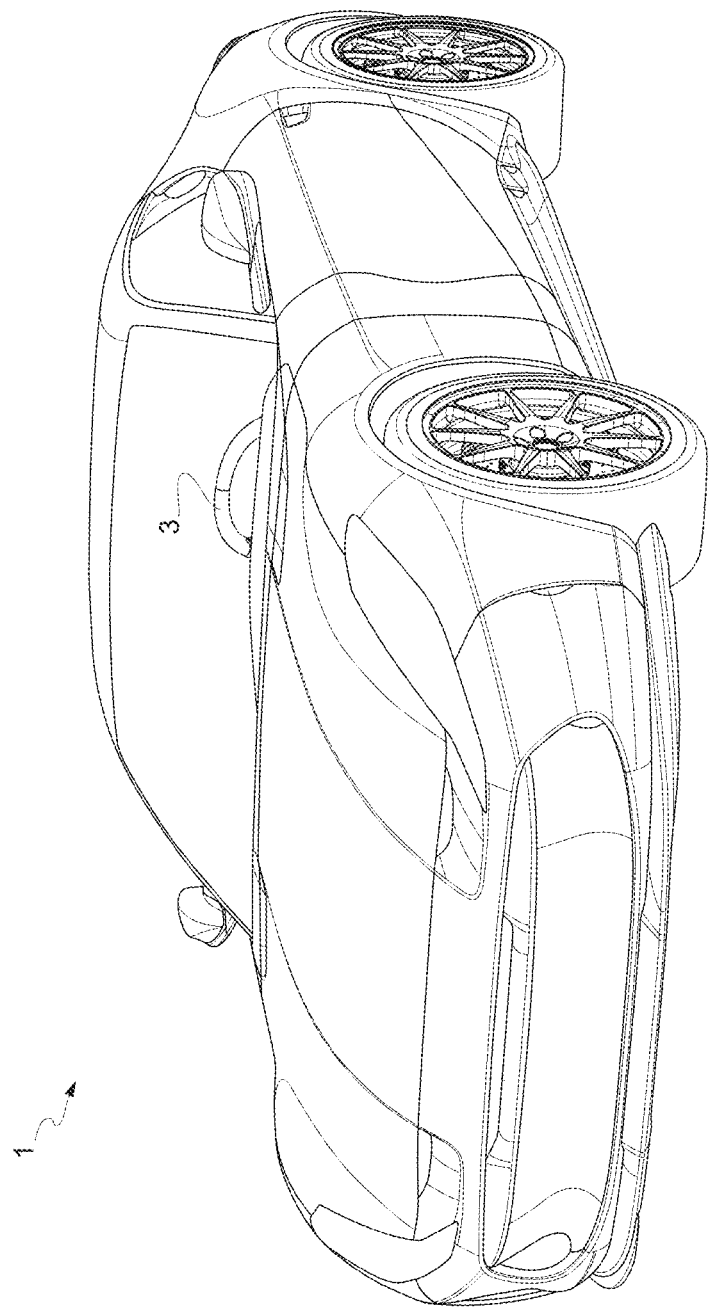
FIG. 1 is a perspective view of a motor vehicle according to the invention.

In FIG. 1, reference number 1 is used to indicate, as a whole, a motor vehicle.

Figure 2:
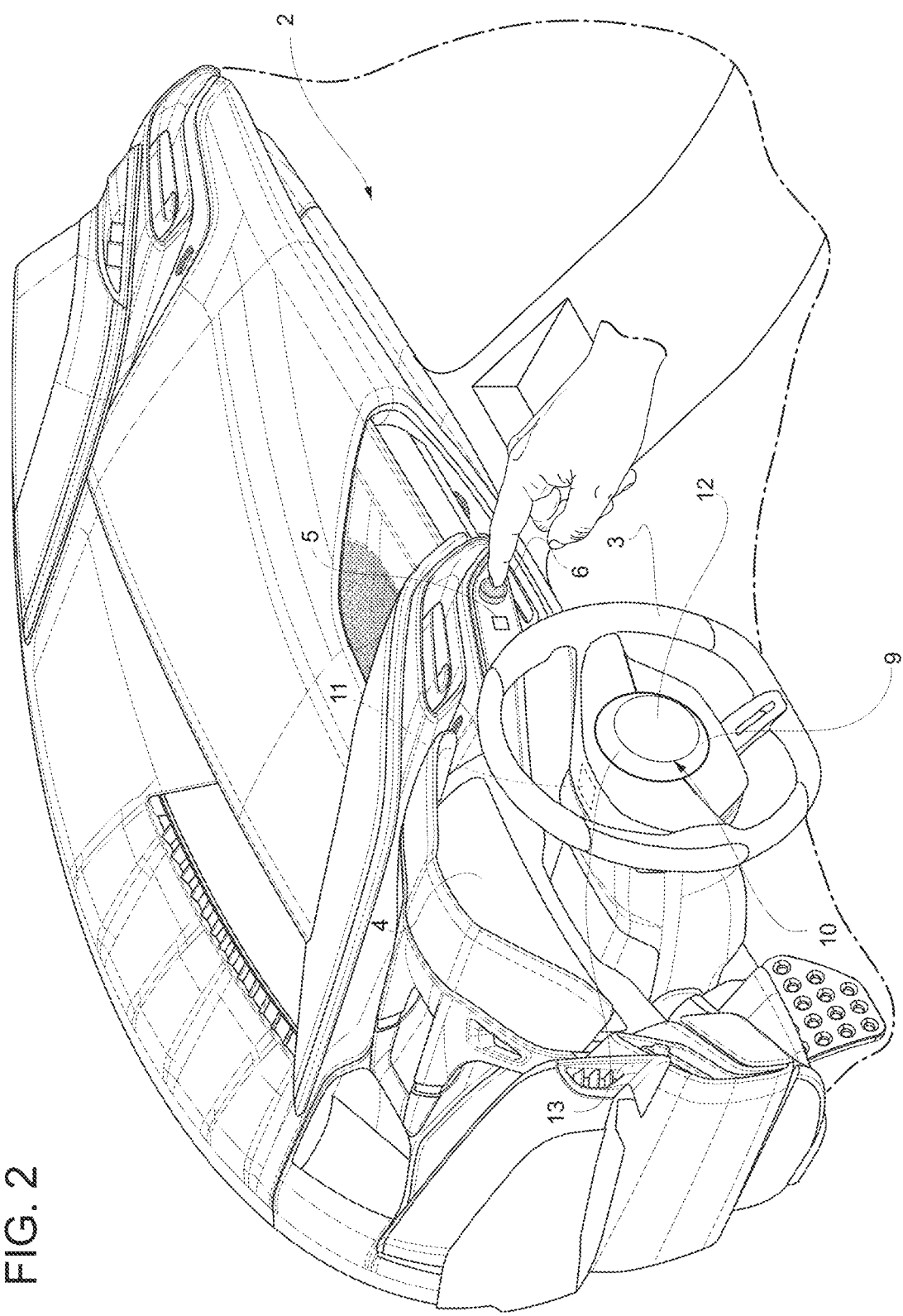
FIG. 2 is a perspective view of a passenger compartment of the motor vehicle of FIG. 1, which shows a control panel and a steering wheel.

The motor vehicle 1 has a passenger compartment 2 shown in FIG. 2. The passenger compartment 2 is provided with a steering wheel 3 and with a control panel 4, both part of the motor vehicle 1.

Furthermore, the motor vehicle 1 comprises a start or activation device 5 (schematically shown as a logic block in the drawings) operable to cause the motor vehicle 1 to switch to an activation state.

In the activation state, the motor vehicle 1 becomes responsive to one or more specific commands of a driver, such as, for example, a start command for a powertrain of the motor vehicle 1.

The powertrain specifically comprises an electric motor. As a matter of fact, in particular, the motor vehicle 1 is a full electric vehicle, even though this is not necessarily the case.

Other possible specific commands could be, for example, a command for turning on the lights, a command for moving the rear-view mirrors, a command for unlocking the steering wheel 3 and the like, without losing generality. Generally speaking, the actual type of commands to which the motor vehicle 1 becomes responsive in the activation state is not strictly essential.

The activation state preferably corresponds to a state of authorization to the starting of the motor vehicle 1. In other words, without the authorization state imparted by means of the activation device 5, the motor vehicle 1 cannot start. Namely, the authorization state is an essential condition, even though not the only essential condition, to allow the motor vehicle 1 to start.

When the motor vehicle 1 is not in the activation state, the motor vehicle 1 is in a deactivation state, in which the motor vehicle 1 does not respond to the specific commands mentioned above. However, this does not mean that the motor vehicle 1 necessarily is not responsive to any type of command. On the contrary, in the deactivation state, the motor vehicle 1 could optionally respond to other commands, such as a command for activating the emergency brake, a command for opening a hood, a command for moving the windows, a command for turning on an anti-theft system and the like, without losing generality.

More in detail, the activation device 5 is operable by the driver by means of a suitable control 6, for example comprising a button, in particular located at a dashboard of the motor vehicle 1. The control 6 could comprise, as an alternative or in addition, a vocal or tactile control (for instance, a fingerprint recognizer) or an optical control (for example, a face recognizer). Alternatively or in addition, the control 6 could further comprise a lever, a knob and the like.

The control 6 preferably works, i.e. operates the activation device 5 in order to cause the motor vehicle 1 to switch to the activation state, subject to a condition, for example defined by a detection of a key or of the presence thereof inside the passenger compartment 2 by means of a key detector device of the motor vehicle 1.

The control 6 could even be absent, whereby the device 5 would automatically work so as to cause the motor vehicle 1 to switch to the activation state, for example when the condition occurs or when the presence of the driver in the passenger compartment 2 is detected by a suitable detector or when a door of the motor vehicle 1 is opened to allow the driver to access the passenger compartment 2.

The key, when present, could be any kind of key, if necessary even a non-physical, namely virtual key. For instance, the key could be replaced by a password or by a vocal command or by a fingerprint or the like.

The key could comprise a traditional key, i.e. a key with a physical member than can be inserted into a suitable seat or ignition switch and then rotated in a clockwise or counterclockwise direction in the ignition key in order to fulfil the aforesaid condition.

Alternatively, the key could comprise a computer-readable means, for instance a USB flash drive.

In other words, the control 6 can be used to cause the motor vehicle 1 to switch to the activation state, like it usually happens, in general, in some known motor vehicles.

Alternatively, the control 6 can be replaced by the key or comprise the key. In this case, the key is inserted into the ignition switch or, more in general, into a seat thereof and possibly, though not necessarily, rotated or moved in the seat in order to cause the motor vehicle 1 to switch to the activation state.

Therefore, the activation state is the state commonly known as key-on state.

Figure 5:
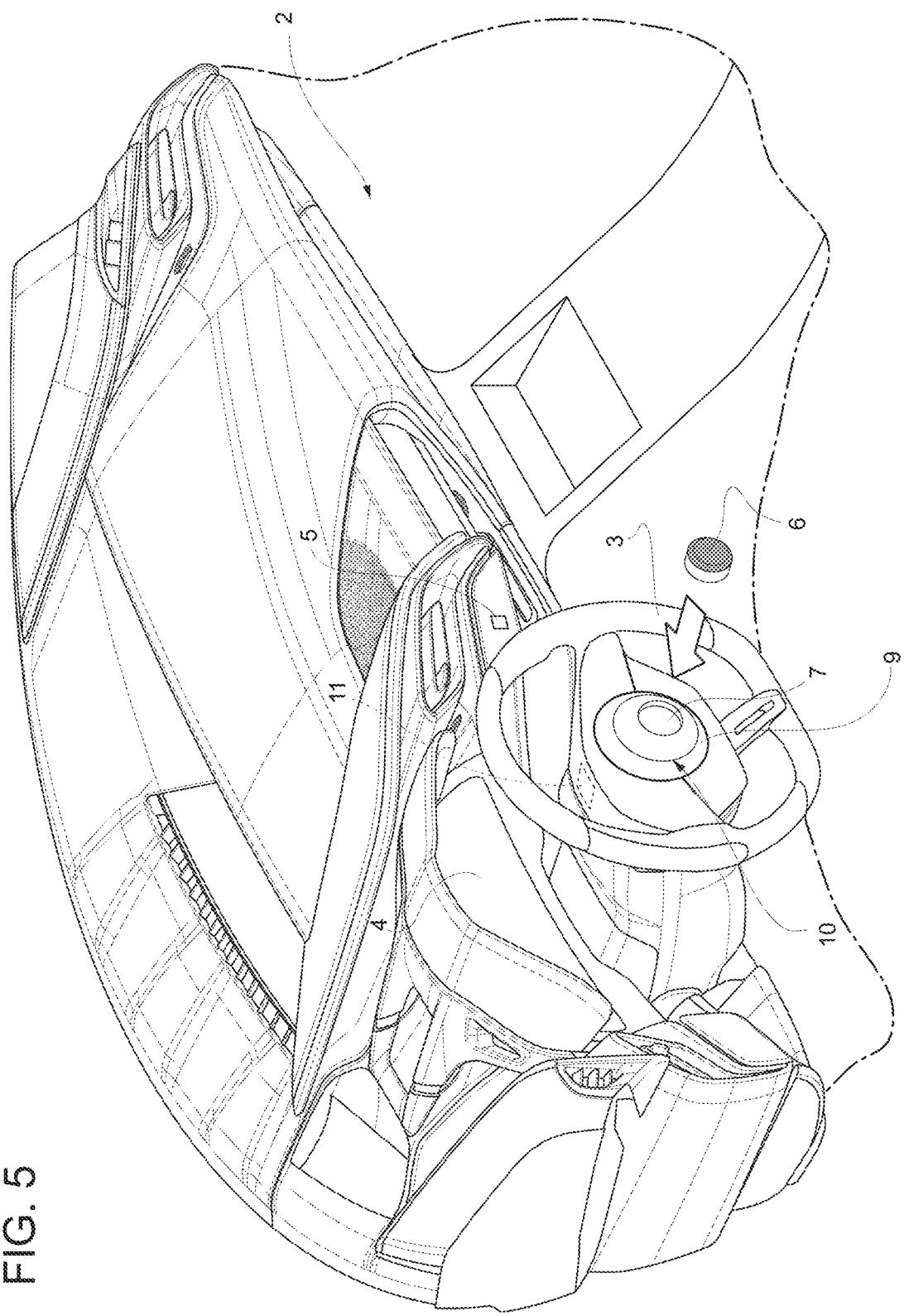
Figure 6:
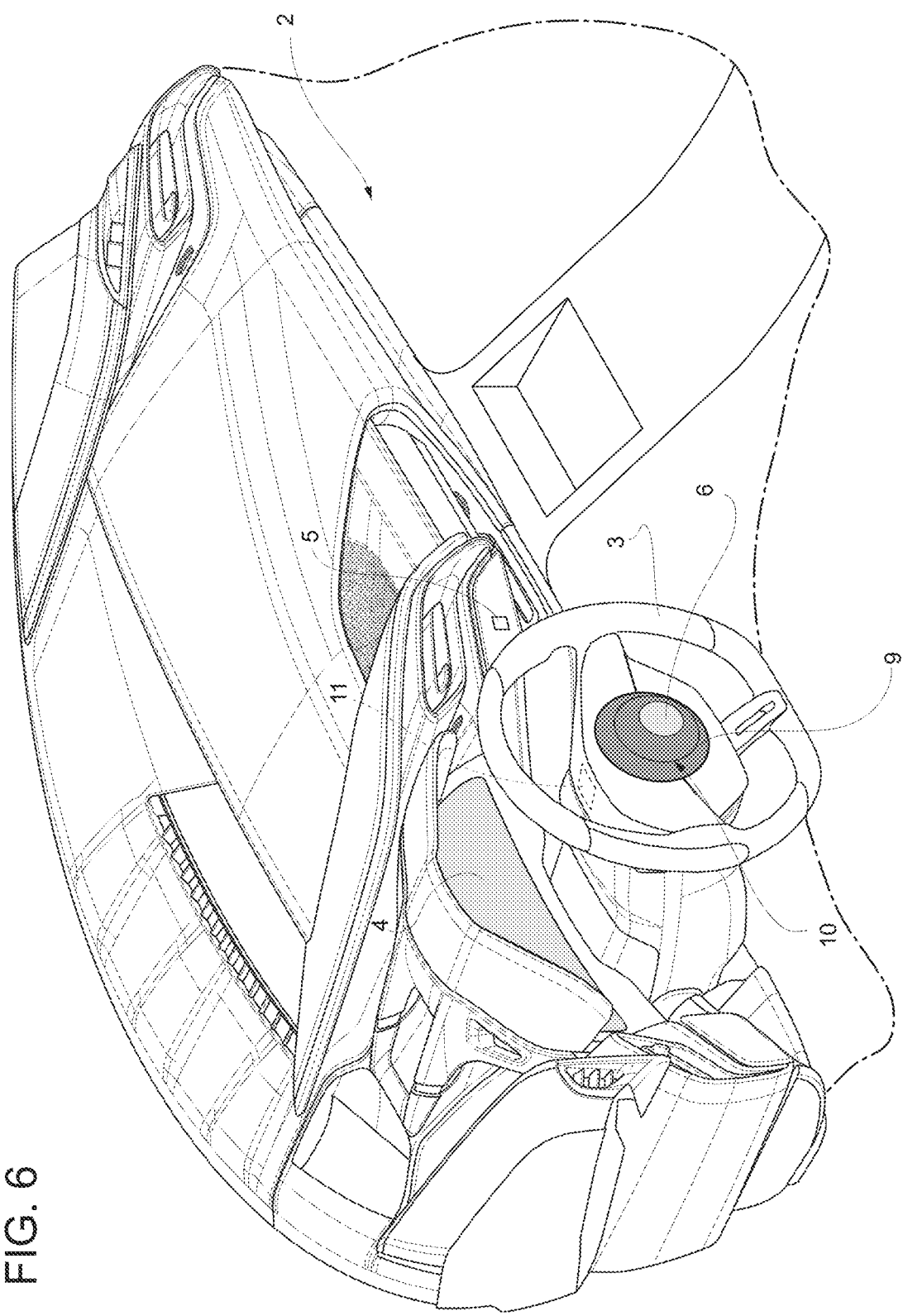

For example, according to the variant of FIGS. 5, 6, the control 6 is replaced by the key, in particular having a physical member. In this variant, the device 5 comprises a seat 7 for the key 6. The seat 7 is obtained, in particular, on the steering wheel 3, even though this is not necessary. As a matter of fact, the seat 7 could also be obtained in the tunnel, on the dashboard or somewhere else.

Furthermore, in this variant, the activation device 5 causes the motor vehicle 1 to switch to the activation state when the seat 7 receives the physical member of the key 6.

More in detail, the activation device 5 comprises a detector of the presence of the physical member of the key 6 in the seat 7. In this way, the activation device 5 causes the motor vehicle 1 to switch to the activation state when the detector detects the presence of the physical member of the key 6 in the seat 7.

The detector can work in different ways; the actual way in which the presence of the physical member is detected is not essential. For example, the detector can have a magnetic or optical operation or it can recognize the physical member through RFID devices or other known devices for key identification.

On the other hand, in the other variants, the device 5 causes the motor vehicle 1 to switch to the activation state when the control 6 is operated, specifically pressed, and preferably when the aforesaid condition is fulfilled, i.e. subject to the fulfilment of the condition.

According to the invention, the steering wheel 3 comprises a transparent portion 10 and a light emission device 11 configured to light the transparent portion 10 when the motor vehicle switches to the activation state by means of the activation device 5.

In this way, the light emitted by the light emission device 11 is transmitted through the transparent portion 10, so as to be visible to the driver.

Hence, the driver perceives that the transparent portion 10 is lit during the activation state of the motor vehicle 1.

Figure 3:
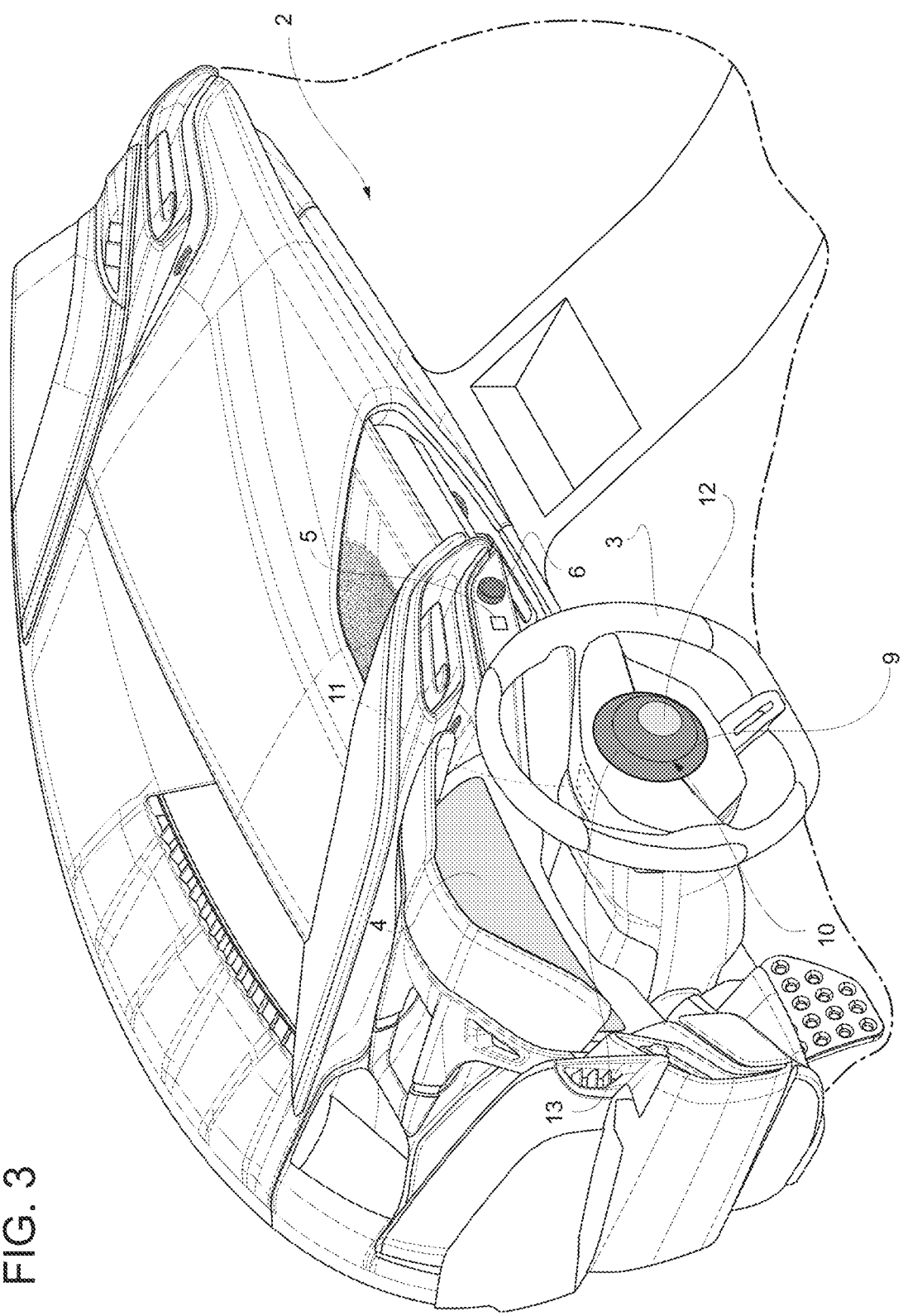
FIG. 3 is similar to FIG. 2, with a portion of the steering wheel in a lit condition during a key-on state of the motor vehicle.
Figure 4:
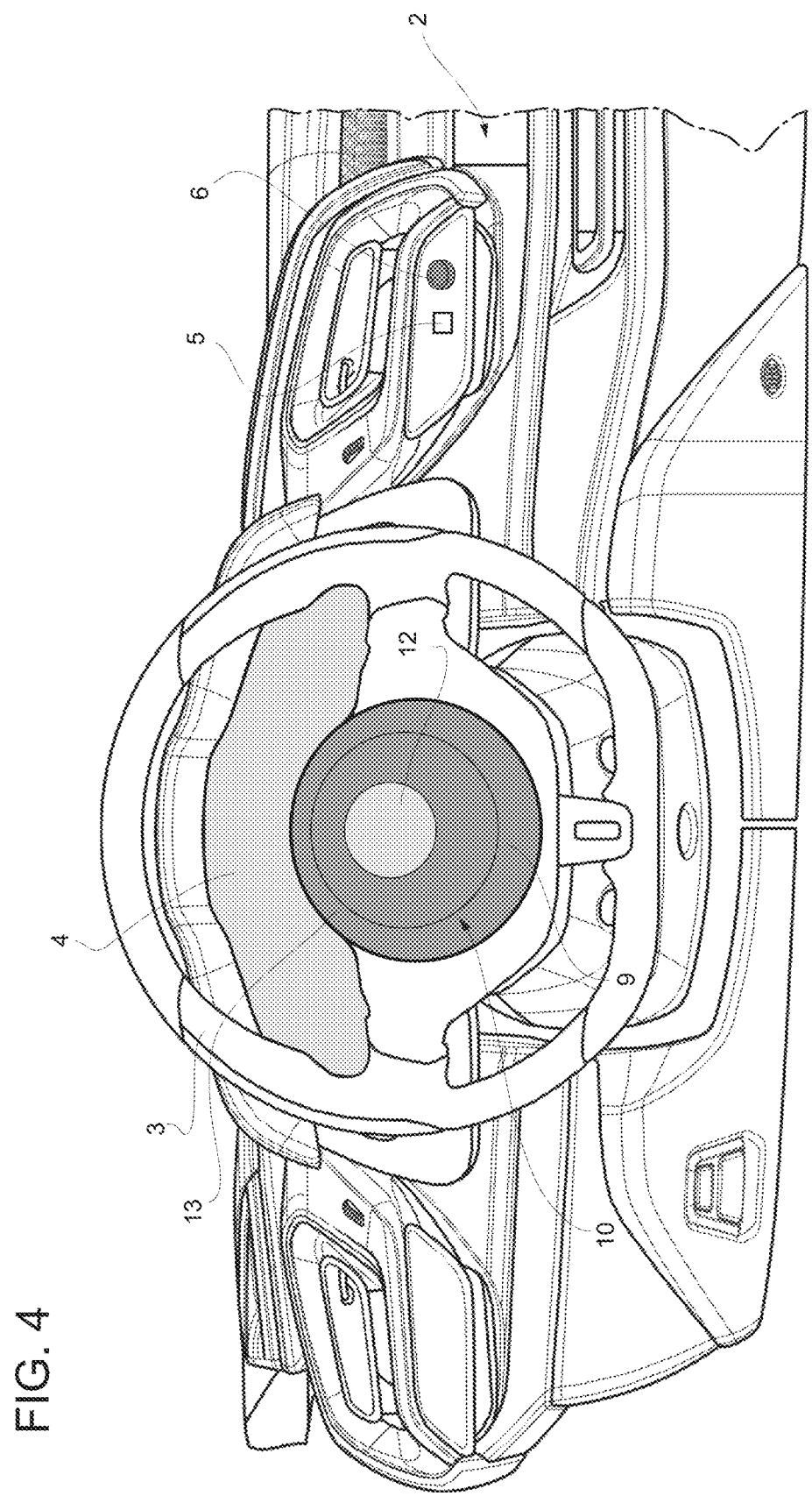
FIG. 4 is a front view of the passenger compartment with the steering wheel in the lit condition of FIG. 3, and FIGS. 5-11 show variants of the passenger compartment of the motor vehicle.

The light emission device 11 is configured to light the transparent portion 10 as soon as (or in the moment in which) the activation state occurs (FIG. 3).

Therefore, the transparent portion 10 is lit by the light emission device 11 only when the activation state occurs. In other words, the light emission device 11 is configured to light the transparent portion only when the activation state occurs.

The light emission device 11 can be of a known kind and, therefore, is only schematically shown. The light emission device 11 can be located behind the transport portion 10, for example so that the transparent portion 10 serves as a screen of the light emission device 11.

For instance, the light emission device 11 could comprise a LED matrix behind the transparent portion 10. Furthermore, the light emission device 11 could comprise one or more light filters, possibly coloured ones, between the LED matrix and the transparent portion 10.

Based on the above, the transparent portion 10 could be considered as an integral part of the light emission device 11.

In particular, the transparent portion 10 and/or the light emission device 11 are designed to break in a controlled manner in response to a predetermined load, for example a load corresponding to the activation of the airbag module. Furthermore, the transparent portion 10 and/or the light emission device 11 are designed, for example thanks to a suitable selection of the materials, shapes and dimensions, so as not to be harmful to the user in front of the steering wheel 3.

Preferably, as shown in FIG. 3, the control panel 4 also lights up when or as soon as the activation state occurs.

To be clear, the term "transparent" should be understood as having a certain degree of transparency, which can be equal to or smaller than 100%, though not zero. In other words, the portion 10 is not completely opaque or reflecting, i.e. it allows light to be transmitted through it.

The portion 10 preferably is translucent, namely it allows light to be transmitted through it, but it does not allow the driver to clearly see what is behind the portion 10, in particular when the light emission device 11 is turned off, i.e. does not emit light or does not light the portion 10.

The portion 10 conveniently is part of an outer cover of an airbag module or consists of the outer cover.

The airbag module for the steering wheel 3 has a commonly known function and consists of known components except for the outer cover, since the latter comprises the transparent portion 10 and, for this reason, is novel relative to the state of the art. Therefore, the sole transparent portion 10 will be described in detail below.

Specifically, the portion 10 is centrally arranged on the steering wheel 3, namely it is arranged at the centre of the steering wheel 3.

The portion 10 comprises a cap 9 with a spheroidal shape. In other words, the portion 10 comprises a ball- or globe-shaped element, basically similar to an eyeball.

The cap 9 has, in particular, a pole at the centre of the steering wheel 3. For example, the pole could be part of a flattened surface relative to the rest of the cap 9 or even of a flat surface of the cap 9.

In the embodiment of FIG. 3, the cap 9 has two distinct zones 12, 13, which respectively transmit light with distinct properties when they are lit by means of the light emission device 11.

In particular, the light transmitted by the zones 12, 13 can have respective different degrees of brightness and/or different colours.

More in particular, the colour of the lit zone 12 is lighter than the one of the lit zone 13.

Alternatively or in addition, the lit zone 12 has a greater brightness or brilliance than the lit zone 13.

However, this is not necessarily the case, since the contrary can also apply to the zones 12, 13, both in terms of lightness of the colour and in terms of brightness or brilliance.

The effect perceived by the driver can be obtained in other ways.

For example, the zones 12, 13 could be made of different materials and/or with different shapes, so as to differently filter the light emitted by the light emission device 11.

Alternatively, according to another example, the light emission device 11 could be directly configured to light the zones 12, 13 in a different manner, for example by emitting light with different colours and/or with a different intensity through the zones 12, 13.

These last two examples could even be combined with one another.

In other words, the light emission device 11 and/or the zones 12, 13 could be configured so that the light transmitted through the zones 12, 13 has distinct properties or so that the driver has a different visual perception of the two zones 12, 13.

For example, as mentioned above, the driver could perceive the zones 12, 13 with different colours or with a different apparent brightness when the zones 12, 13 are lit, i.e. when the light emission device 11 lights the portion 10 and, consequently, the cap 9 with its zones 12, 13.

In the embodiment shown herein, the zone 12 is polar, namely it includes the pole of the cap 9 and is a spheroidal cap itself.

The zone 13 can be obtained as a subtraction of the zone 12 from the cap 9; hence, the zone 13 defines, in particular, a spheroid segment between two planes that are secant, more in particular orthogonal to an axis of the cap 9 going through the pole.

Furthermore, the spheroid segment defined by the zone 13 constitutes a base for the spheroid segment defined by the zone 12. The zones 12, 13 are adjacent to one another and are ideally separated by a plane that is secant, in particular orthogonal to the axis of the cap 9 going through the pole.

In practical terms, following an analogy with an eyeball, the zone 12 would be the iris, whereas the zone 13 would be pupil.

Figure 9:
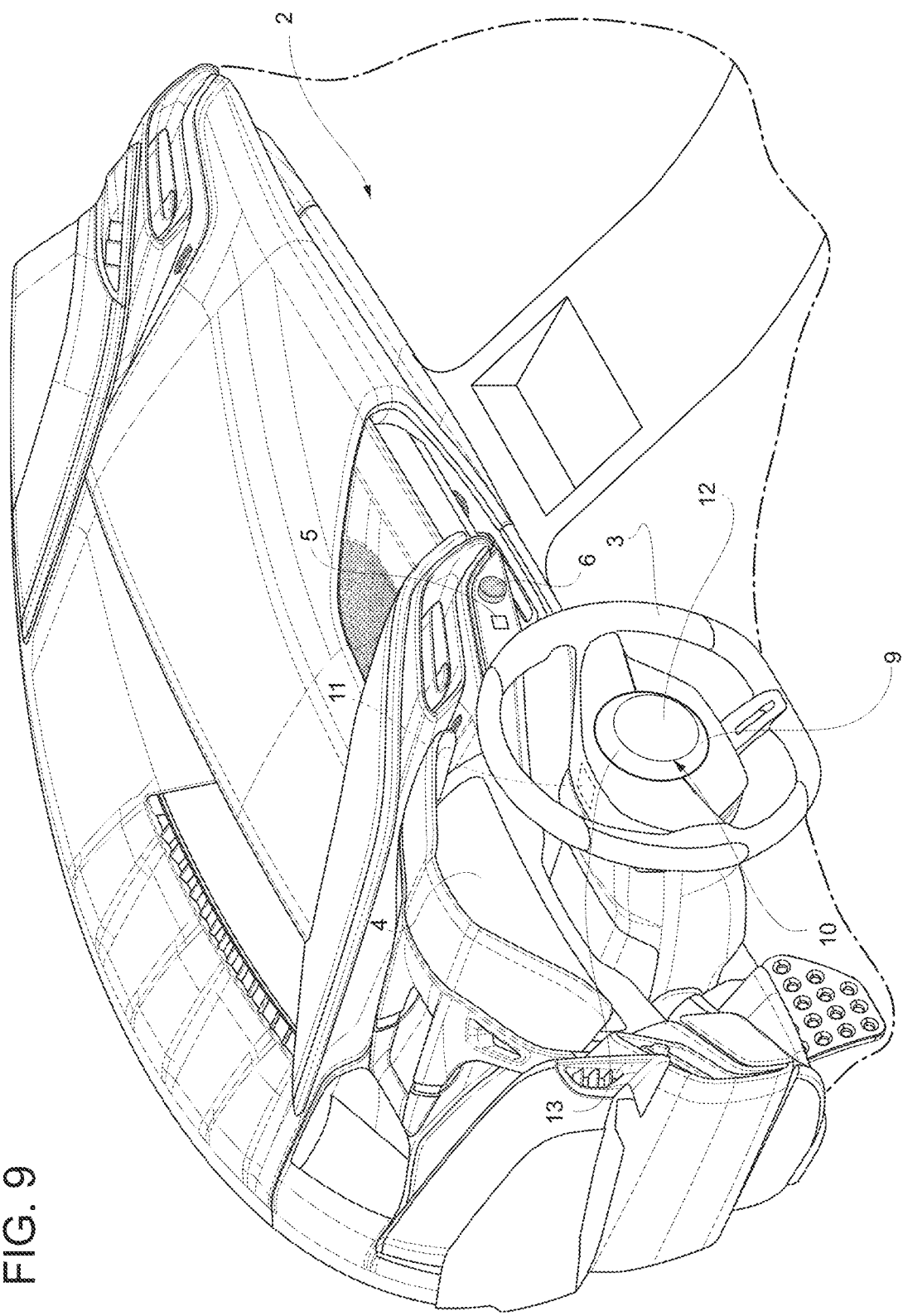
Figure 10:
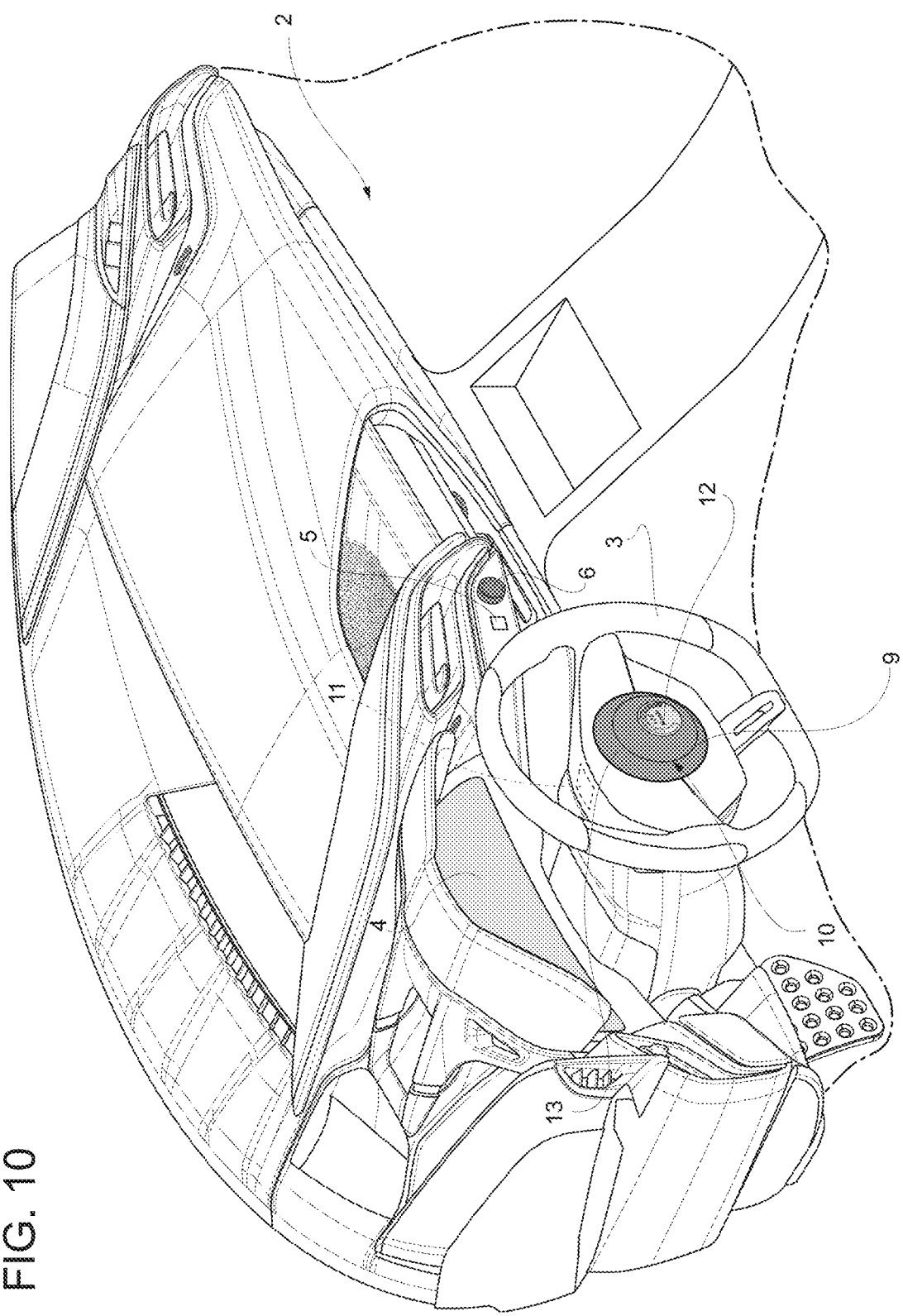
Figure 11:
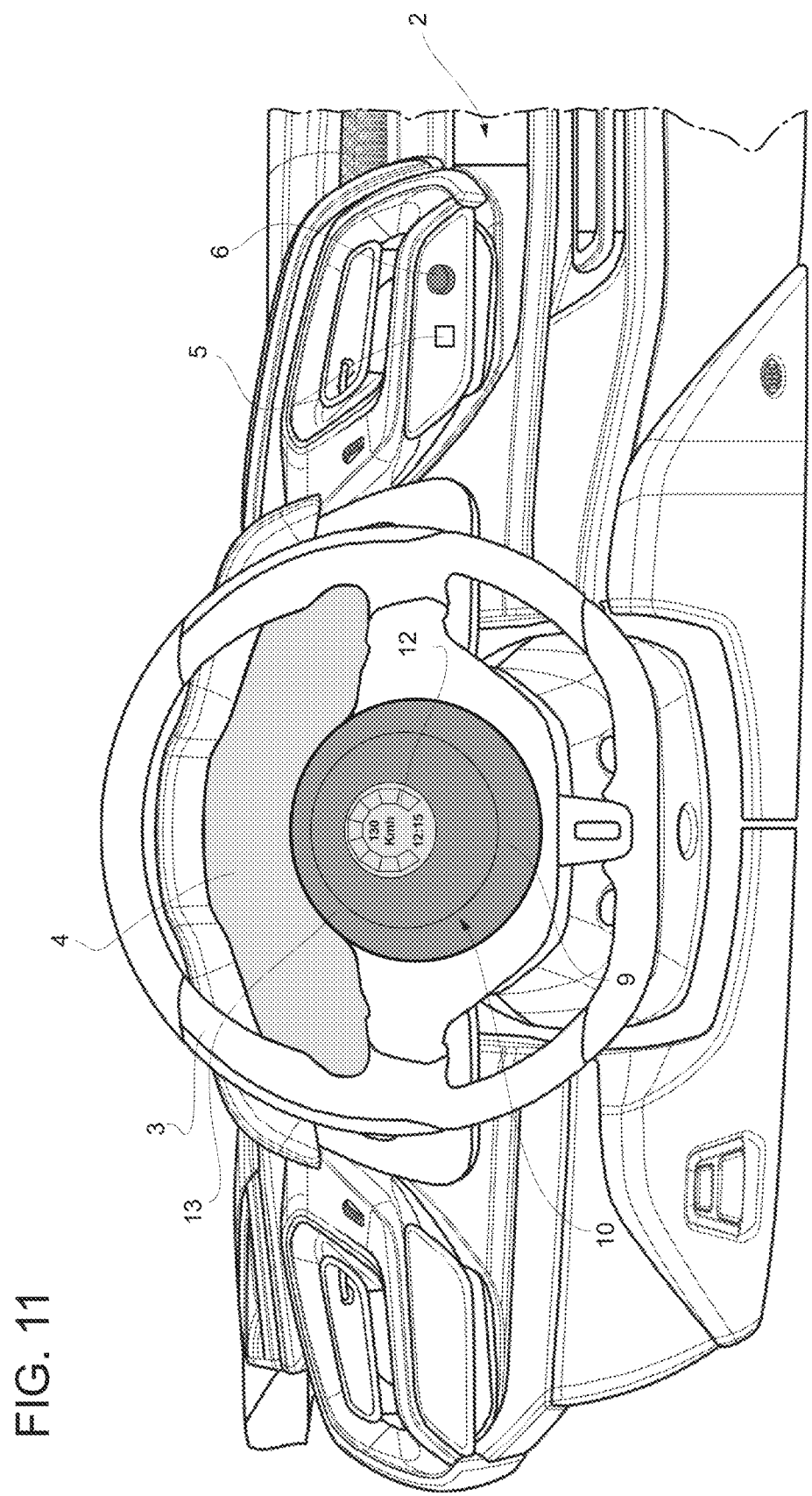

According to the variant of FIGS. 9-11, the zone 12 comprises an indicator, specifically a speedometer, to provide the driver with driving information. In particular, the indicator is illuminable and provides the driving information only when it is illuminated. Since the area 12 is lit when the motor vehicle 1 is caused to switch to the activation state through the activation device 5, the indicator provides the information only when the motor vehicle 1 is in the activation state.

Figure 7:
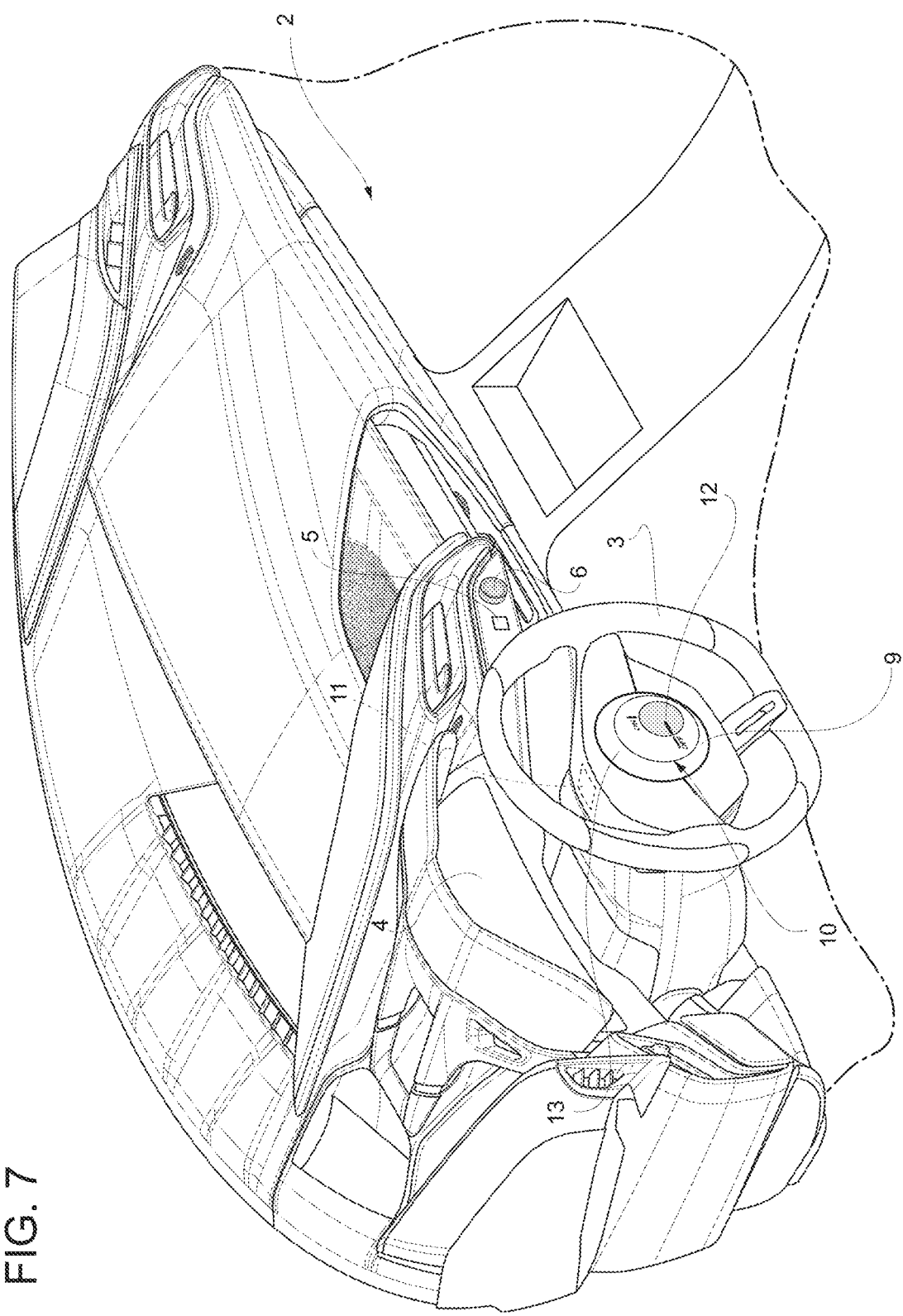
Figure 8:
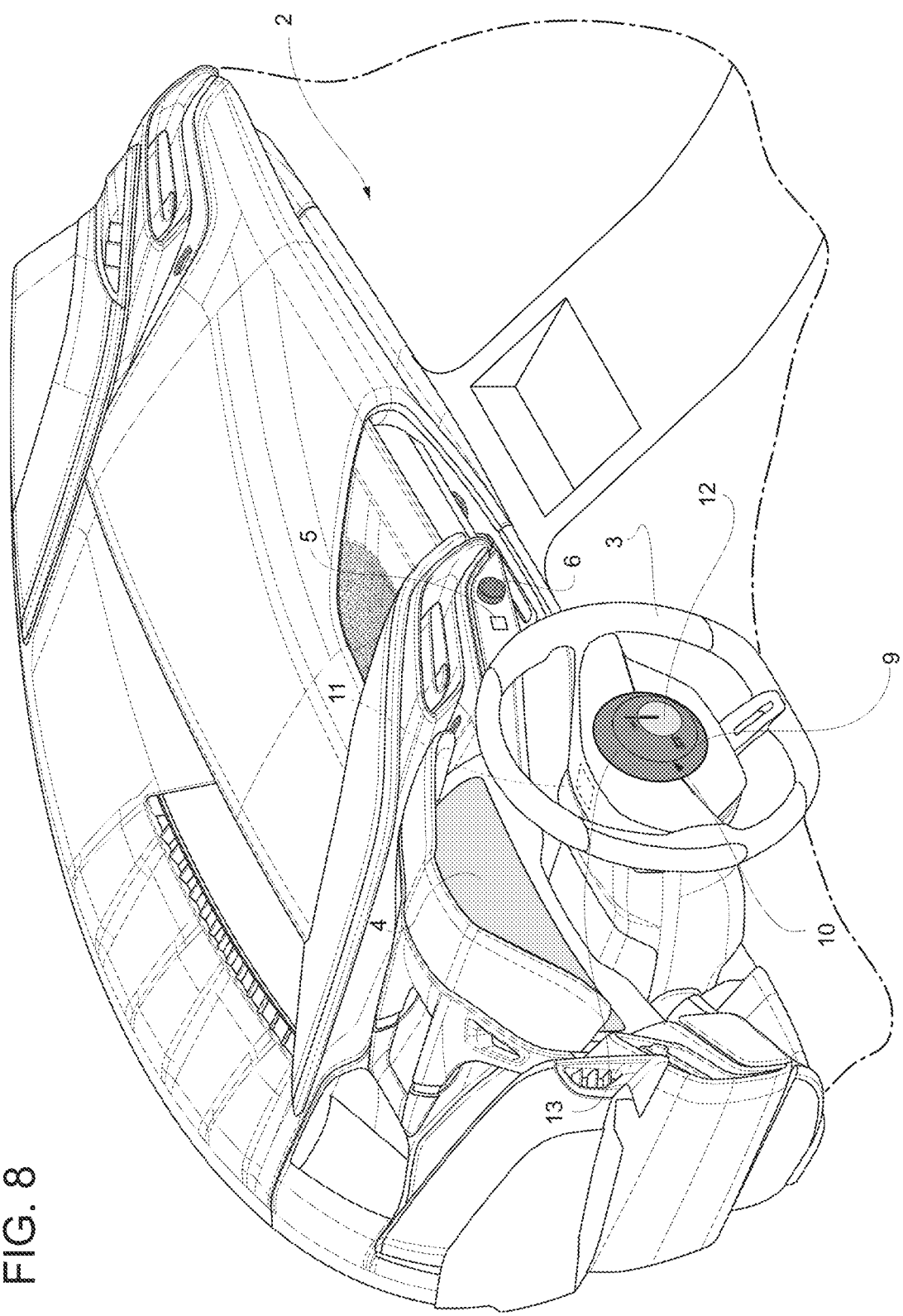

According to the variant of FIGS. 7, 8, the zone 12 can rotate around a rotation axis of the steering wheel 3 or around the axis of the cap 9 relative to the zone 13. In this variant, the motor vehicle 1 comprises an actuator device not shown herein and configured to rotate the zone 13 from a first position to a second position, when the motor vehicle is caused to switch to the activation state through the activation device 5. The zone 12 preferably includes an indicator, for example a pointer, which cooperates with another indicator of the zone 13, when the zone 12 is in the second position, to indicate the activation state to the driver.

Owing to the above, the advantages of the motor vehicle 1 according to the invention are evident.

The driver has an ideal perception of the activation state, since the steering wheel 3 lights up through the transparent portion 10 and the light emission device 11.

In particular, the light emitted by the light emission device 11 and transmitted through the transparent portion 10 directly enters the primary visibility cone of the driver, thus stimulating his/her attention in an improved manner compared to the prior art.

The shape and the arrangement of the transparent portion 10 further help improve the driver's perception of the activation state of the motor vehicle 1.

Finally, the motor vehicle 1 according to the invention can be subjected to changes and variants, which, though, do not go beyond the scope of protection set forth in the appended claims.

The invention claimed is:

1. A motor vehicle (1) comprising a steering wheel (3) and an activation device (5) operable to cause the motor vehicle (1) to switch to an activation state, in which the motor vehicle (1) becomes responsive to one or more specific commands of a driver,
   wherein the steering wheel (3) comprises a transparent portion (10) and a light emission device (11) configured to light the transparent portion (10) simultaneously with or as soon as when the motor vehicle switches to the activation state by means of the activation device (5).

2. The motor vehicle according to claim 1, wherein the steering wheel (3) comprises an airbag module having an outer cover comprising said transparent portion (10).

3. The motor vehicle according to claim 1, wherein the transparent portion (10) is arranged at the centre of the steering wheel (3).

4. The motor vehicle according to claim 1, wherein the transparent portion (10) comprises a spheroidal cap (9).

5. The motor vehicle according to claim 4, wherein the spheroidal cap (9) has a pole at the centre of the steering wheel (3).

6. The motor vehicle according to claim 4, wherein the spheroidal cap (9) comprises a first zone (12) and a second zone (13) respectively transmitting light with distinct properties when they are lit by means of the light emission device (11).

7. The motor vehicle according to claim 6, wherein the first zone (12) is polar and, in turn, is defined by a further spheroidal cap.

8. The motor vehicle according to claim 6, wherein the first zone (12) has a greater brightness than the second zone (13), when the first and the second zone (12, 13) are lit by means of the light emission device (11).

9. The motor vehicle according to claim 1, wherein said one or more specific commands include a command to turn on a motor of the motor vehicle (1).

10. The motor vehicle according to claim 1, wherein the activation device (5) is operable by the driver by means of a command (6).

\* \* \* \* \*